(12) United States Patent  
George

(10) Patent No.: US 6,969,802 B1  
(45) Date of Patent: Nov. 29, 2005

(54) ELECTRICAL CONNECTOR

(76) Inventor: David M. George, 114 Bohemian Dr., Middletown, DE (US) 19709

( * ) Notice: Subject to any disclaimer, the term of this patent is extended or adjusted under 35 U.S.C. 154(b) by 0 days.

(21) Appl. No.: 10/936,326

(22) Filed: Sep. 8, 2004

(51) Int. Cl.⁷ .............................................. H02G 3/18
(52) U.S. Cl. ...................... 174/65 R; 174/167; 174/53; 174/152 G
(58) Field of Search .......................... 174/65 R, 167, 174/53, 152 G

(56) References Cited

U.S. PATENT DOCUMENTS

| | | | | |
|---|---|---|---|---|
| 5,607,323 A | * | 3/1997 | Foster et al. ................ | 439/557 |
| 5,927,892 A | * | 7/1999 | Teh-Tsung ................. | 403/259 |
| 6,143,982 A | * | 11/2000 | Gretz ........................ | 174/65 R |
| 6,765,148 B2 | * | 7/2004 | Rix ........................... | 174/65 G |

* cited by examiner

*Primary Examiner*—Dean A. Reichard  
*Assistant Examiner*—Jinhee Lee  
(74) *Attorney, Agent, or Firm*—Jeffrey C. Lew

(57) ABSTRACT

An electrical connector for clamping a cable to an electrical junction box. The connector has a cylindrical body with a flange at one end and a male threaded portion adapted to mate with the threads of a female connector receptacle on the box. The connector includes a cable immobilizer that receives the cable inserted into the box from the flanged end of the connector and which bites into the cable insulation such that the cable cannot be withdrawn after insertion. In a preferred aspect the connector has radially extending protrusions which in concert with the end flange allow the connector to insert into and lock in a non-threaded, knockout style connector receptacle.

14 Claims, 3 Drawing Sheets

ELECTRICAL CONNECTOR

FIELD OF THE INVENTION

This invention relates to electrical connectors to hold and stabilize insulated wire and cable in electrical junction boxes.

BACKGROUND OF THE INVENTION

Electrical codes generally require that wire or cable entering junction boxes be clamped and thus immobilized to prevent connections from loosening and accidentally causing a disconnect. Clamping also prevents insulation jackets from being chafed by moving contact with exposed portions of the junction box, and thereby reduces the risk of electrical short circuits and associated damage.

This invention is primarily concerned with connections to standard electrical junction boxes for nominally 110–220 volt, alternating current electrical service in residential, commercial and light industrial electric power supply service. Outdoor, weather-exposed junction boxes typically have one or more connector receptacles formed by a built-up boss in the box wall. The boss is usually drilled and female screw threads are formed on the interior surface of the resulting hole through the boss. These threads are designed to mate with male threads of a connector. After threading the connector into the receptacle, wire can be inserted axially through and clamped to the connector. Vacant receptacles are sealed with screw caps. For indoor applications where the box is sheltered from weather conditions, the junction boxes typically have a thin wall construction, usually of metal or plastic. The wall of this type box normally has one or more knock-out style connector receptacles which basically includes a pre-cut, typically circular hole with a cover. The cover is of the same material as the wall of the box and is usually completely separated from the perimeter of the hole except for a small link. When a particular connector receptacle is to be used, the cover is pried away from the wall which causes the link to flex and break. This exposes a hole of suitable size that a male-threaded end of a connector can be freely inserted and secured with a female-threaded, typically thin, ring-shaped nut.

Among many types of electrical connectors for junction boxes two in common use are of interest with respect to the present invention. The first, and perhaps older, is a typically metallic, generally tubular structure, male threaded device, sometimes known as a "Romex" connector. It has male threads at one end and a vise-style cable clamp at the other end. The cable clamp uses specially formed vise jaws adapted to squeeze together and thereby seize a cable inserted between the jaws when clamping screws that are provided as part of the clamp are turned. Generally a screwdriver or similar tool is required to tighten the clamping screws.

These clamp connectors are designed for use with either the outdoor (i.e., threaded) or indoor (i.e., knock-out style) junction box connector receptacles. For a threaded receptacle, the male threaded end of the connector is screwed directly into the receptacle. For knock-out style receptacles, the threaded end of the connector is passed through the hole and a female threaded lock nut is screwed onto the male threads from the other side of the box wall. The sizes of the connector body and the lock nut are selected to anchor the connector against the wall.

This type of connector has notable shortcomings. First, it is time-consuming and labor intensive to install. This is because the connector must be mounted on the box either by threading into a receptacle or by screwing on a lock nut and then the clamping screws must be tightened to clamp the cable between the vise jaws. Second, the clamping of the jaws can be difficult due to placement of the box in relation to the structure being wired. That is, the clamping screws may be awkward or essentially impossible to access for tightening after the box is assembled, installed and the cable is inserted through the connector. Thirdly, because it is made of metal and the jaws can be tightened too much, the clamp can penetrate the cable jacket and short circuit the conductors. Fourthly, the vise-jaw portion of the connector usually extends at least about ½ inch outside the box. When a box is mounted near a flat structure finished wall, the connector often contacts the wall and causes the box to pivot (i.e., to rock) about the point of contact rather than lie flat against the wall. This is unsightly and can lead to wear and deterioration of the structure finished wall.

The second, perhaps more recently developed conventional connector, sometimes known as a "Hit-lock" overcomes some of the above-mentioned shortcomings. This clamp connector is typically made of plastic and is designed to snap into the unthreaded holes of a junction box knock-out style receptacle. It has a generally cylindrical structure with a broad flange at one end and a secondary flange stubs protruding radially outward a short distance from the broad flange. The connector is snapped into the receptacle usually by tapping the broad flange face with a hammer such that the stubs are forced through the receptacle hole and, together with the interior face of the broad flange, grip the wall of the box to mount the connector in place. The cable is held in place by a jamming clamp having several prongs pointing toward the inside of the connector. The cable is pushed into the junction box through the connector between the prongs. The prongs bear upon and bite into, but do not penetrate, the cable jacket, thereby preventing the cable from being pulled in the opposite direction out of the box.

While the "Hit-lock" connectors are non-conductive and do not have vise-jaw style, screw-threaded clamps, they do not overcome all of the above listed disadvantages of the "Romex" connectors. Most notably, they are designed for use only on unthreaded holes. There thus is a need and an opportunity in the electrical arts for a connector device that is non-metallic, avoids a "screw down" cable clamp, and which can be used in a threaded receptacle outdoor junction box. There is also a desire to have a single cable connector that can be used with both indoor and outdoor style junction box receptacles. There is further need for a connector that allows a junction box to mount closely and securely to a structure finish wall.

SUMMARY OF THE INVENTION

The present invention provides an electrical connector for clamping a jacketed cable to a standard electrical junction box having female screw threaded connector receptacle in an exterior wall of the box, said connector comprising (a) a hollow cylindrical body defining a tubular space adapted to axially receive the cable, (b) a butt flange positioned at a first end of the body, (c) circumferentially disposed male screw threads on an exterior portion of the body, said threads being operative to mate with the female screw threaded receptacle, (d) a self-actuating cable immobilizer in the tubular space adapted to irreversibly accept the cable inserted axially into the first end, in which the butt flange has a radial dimension effective to stop the connector from screwing into the receptacle in an axial direction beyond a position at which the butt flange contacts the exterior wall.

In addition there is provided an electrical connector as described above which also is suitable for clamping the jacketed cable to a standard electrical junction box having a knock-out style connector receptacle defining a hole through the wall of the box having a uniform thickness, the hole having a radial dimension larger than the male screw threads and smaller than the radial dimension of the butt flange, which electrical connector further comprises a set of locking protrusions extending radially outward from the body at an axial distance from the butt flange slightly greater than the uniform thickness, the protrusions defining a circumscribing perimeter having a radial dimension greater than that of the hole, and in which the protrusions are operative to reversibly deflect radially inward when the connector is pushed axially into the knock-out style connector receptacle, thereby locking the butt flange and the locking protrusions on opposite sides of the wall.

DETAILED DESCRIPTION OF THE INVENTION

Figure 1:
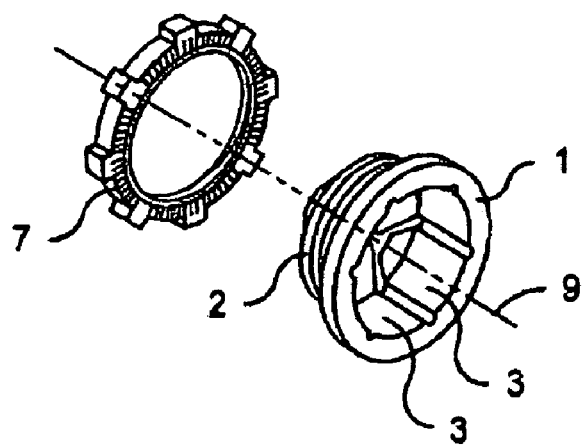
FIG. 1 is a perspective drawing of an embodiment of the electrical connector of the invention together with a view of a lock nut 7 optionally used to mount the device to a junction box.
Figure 2:
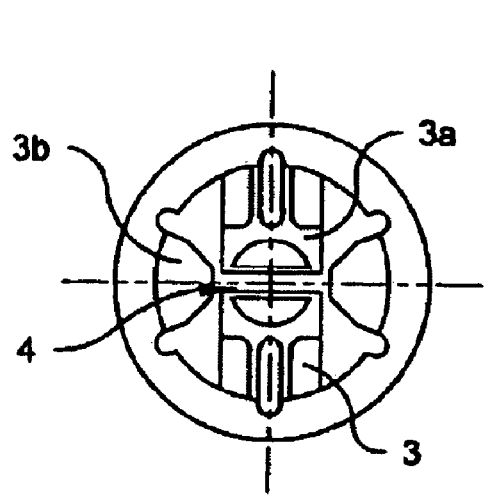
FIG. 2 is an end elevation view of an embodiment of the electrical connector in FIG. 3 as seen along line 2—2.
Figure 3:
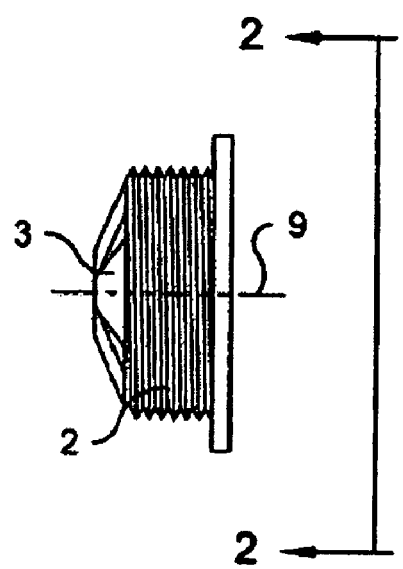
FIG. 3 is a side elevation view of the embodiment of the electrical connector of FIG. 1, illustrating more prominently the threaded portion and cable immobilizer.

The present invention is a novel, preferably non-conducting, non-metallic electrical connector that allows wire or cable to be inserted into a junction box, but prevents its reversible movement. One preferred embodiment of the electrical connector is illustrated in FIG. 1–FIG. 3. This connector comprises a cylindrical body 2 having external male screw threads, a butt flange 1 at one end, and a cable immobilizer at the other end. The cable immobilizer comprises prongs 3 adapted to prevent the reversible axial movement of the insulated wire or cable to be held by the prongs.

FIG. 1 illustrates an embodiment where the butt flange is a circular flange. When a circular flange is utilized, the diameter of the flange should be larger than the diameter of a standard threaded hole in a standard junction box. With this configuration the connector can be screwed into the junction box up until the point where the flange fits tightly against the wall of the junction box. The shape of the flange is not critical so long as it will not pass through a standard junction box circular hole. Indeed, the flange can be noncircular. Thus the diameter of a circular flange or characteristic dimension of a noncircular flange is at least about 1.6 cm and preferably at least about 2.5 cm.

In another contemplated embodiment, the lateral dimensions of the flange are considerably larger than the range set forth above. This can be advantageous when the exterior wall of the junction box through which the connector is mounted is close to a structure finished wall. A broad dimensioned, flat outside faced butt flange can provide a stable surface in contact with the finished wall. This will prevent the box from rocking unstably against the wall as can occur with conventional vise-jaw clamp connectors that protrude far beyond the outside wall of the junction box.

The disposition of the prongs 3 is illustrated by FIGS. 1–3. FIG. 2 provides an end view looking toward the circular butt flange 1 from the direction of line 2—2 in FIG. 3. As illustrated in FIG. 2, there will preferably be four prongs. Two of the prongs 3a will end in substantially flat or straight edges; the other two 3b will end in either curved edges or flat or straight edges that are substantially shorter than the edges of the 3a prongs. The prongs will alternate around the interior of the circular flange so that the two 3a prongs will be opposite each other and the two 3b prongs will be opposite each other. This arrangement provides an approximately rectangular space 4 bounded on two sides by the 3a prongs and on the other two sides by the 3b prongs. The dimensions of the space 4 will be such that it will tightly hold standard conventional insulated cable. That is, the space between the prongs will be such as to allow the cable to be thrust between the prongs, thereby causing the prongs to bend radially outward slightly to admit the cable without breaking the prongs, and causing the prongs to bite into the relatively soft cable insulation jacket as the prongs exert radially inward pressure while attempting to return to their initial pre-cable insertion position. Typically the distance between the straight edges of the two straight-edged prongs 3a will be in the range of about 0.1–10 mm, and the distance between the ends of the pointy-edged prongs 3b will be in the range of about 0.1–20 mm.

FIG. 3 is a side view of the novel electrical connector showing the threaded exterior of the cylindrical body and the prongs 3 located at the second end of the cylindrical body. The length of the threaded portion, or the cylindrical body, need not be any longer than required for securely screwing into a standard threaded junction box hole. Preferably the length will be from about 0.5 to about 1.5 cm. A more preferred length is from about 0.75 to about 1.1 cm. The diameter of the threaded cylindrical body and the pitch of the threads will preferably be such that it will screw into the standard threaded holes found on standard junction boxes. The value of this diameter typically is about 2 cm.

The novel connector may also be utilized in an unthreaded knock-out style receptacle. In this situation the threaded portion is passed through the hole of the junction box receptacle and then a lock nut 7 (FIG. 1) is screwed onto the threaded portion in order to tightly secure the junction box wall between the face of the nut and the opposing face of the butt flange.

Once the connector has been attached to the junction box by either of the two methods set forth above, the cable is then passed axially through the prongs from the opening at the butt flange end of the cylindrical body. The cable immobilizer prongs 3 are adapted to allow axial movement of cable in the direction from the first end to the second end of the cylindrical body, but to prevent the reversible axial movement. This is accomplished by canting the prongs at an acute angle with respect to the axis 9 of the cylindrical body. The prongs are attached at their bases to the body and point in a direction away from the butt flange.

The illustrated prong shapes are deemed advantageous for common, generally oblong cross section type 12-3 and type 14-2 electrical cable. These shapes and other prong configurations can be used for circular cross section and larger or smaller cable dimensions. The novel connector should not be deemed limited to utilizing prongs to effect cable immobilization. For example, other self-actuating clamps such as spring loaded cams, ratchets or other conventional jamming grip clamps can be used. The cable immobilizer can be positioned anywhere along the length of the connector body, although placement at the end is shown in the figures.

Figure 4:
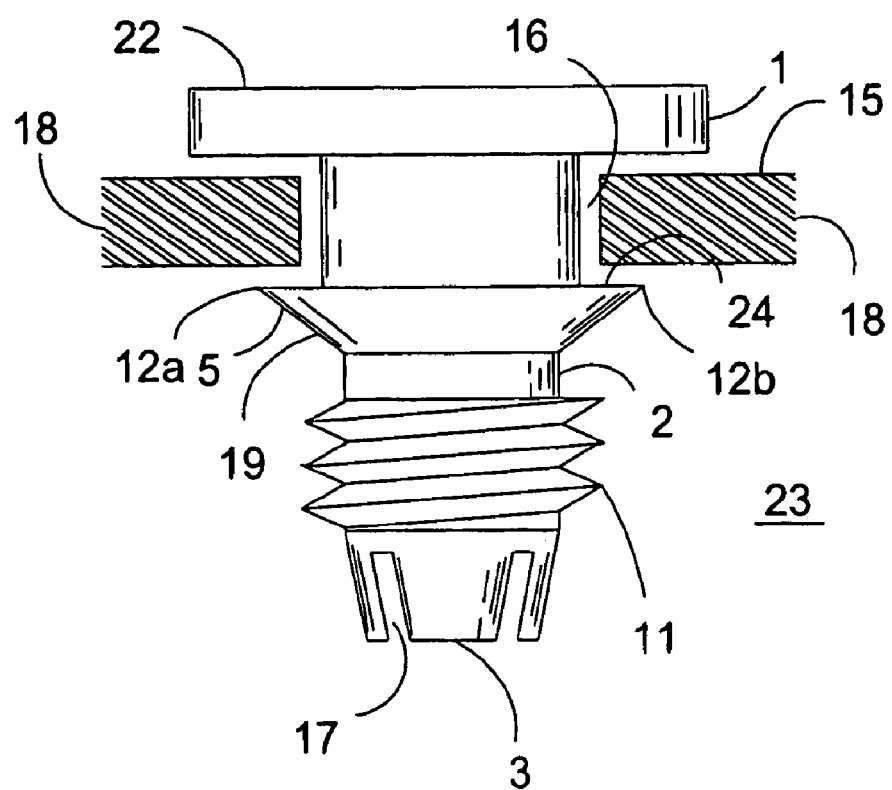
FIG. 4 is a side elevation view of another embodiment of the novel electrical connector.

In another preferred embodiment the connector according to this invention particularly useful in that it is suited to screw directly into screw-threaded receptacles of outdoor junction boxes and to mounting into unthreaded knock-out style connector receptacles of indoor boxes without the use of a separate lock nut. Such a novel screw connector is shown in FIG. 4. This connector has cylindrical body 2, screw threads 11, immobilizer prongs 3 and butt flange 1. In addition, the connector has a locking protrusion 5, in the form of a circular flange located axially along the body between the butt flange and the cable immobilizer. The locking protrusion flange has an outer diameter (i.e. tip 12a to 12b distance) less than that of the butt flange and slightly larger than the standard junction box unthreaded hole 16. FIG. 4 shows partial cutaway sections 18 of the junction box wall which define the connector receptacle hole 16.

The connector shown in FIG. 4 is used by inserting the cable immobilizer end through the junction box receptacle hole to the point at which the leading edge 19 of the locking protrusion contacts the outer side 15 of the box wall. The connector is forced by pressure applied on the outside surface 22 of the butt flange against the wall. This causes the tips of the locking protrusion to deflect inwardly and allows the connector to slide into the box until the protrusions emerge from the hole on the inside 23 of the box.

There the protrusion expands to initial dimensions and, in concert with the butt flange, anchors the connector to the wall. Preferably the protrusion leading edge 19 has a slope inclined at an acute angle with the axis of the connector and the trailing edge 24 is perpendicular to the axis. Additionally, the connector is preferably composed of a non-metallic non-conductive polymer material. The material is selected to provide stiffness with enough flexibility to allow the protrusion to deflect radially inwardly a slight extent.

Such geometric and composition configuration aids the insertion and locking of the connector. The axial distance between the trailing edge 24 and the opposing face of butt flange 1 is selected to be slightly larger than the receptacle wall thickness. This helps to hold the connector in place without the need of using a lock nut on threads 11.

However, this connector can be used in a threaded, outdoor junction box connector receptacle by screwing threads 11 directly into the female socket of the receptacle until the leading edge 19 biases against the outer side of the box wall. Consequently, this connector can, by itself, replace both the metallic vise-jaw type and the plastic hit-lock type of conventional connector. This feature presents the advantage of allowing the parts supplier to reduce inventory of different parts because a single part will suit both applications.

Figure 5:
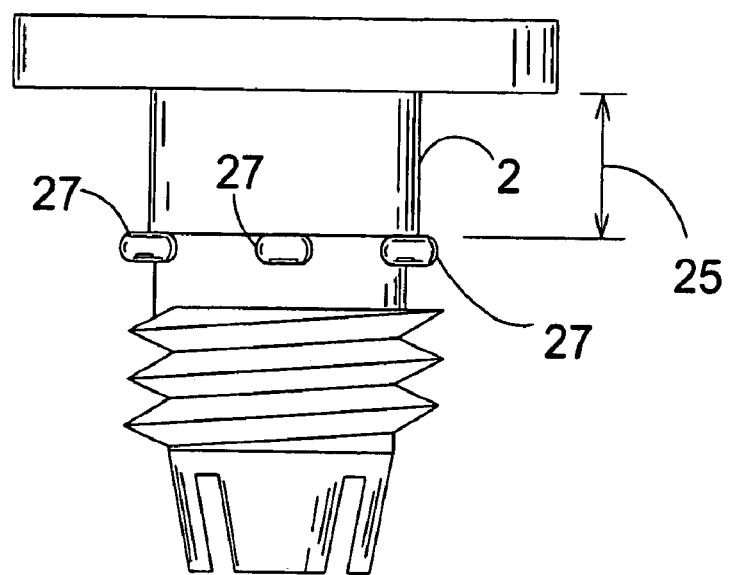
FIG. 5 is a side elevation view of another embodiment of the novel electrical connector.

In another embodiment, FIG. 5 the locking protrusions have the form of a set of individual protrusions 27 disposed circumferentially about the cylindrical body 2 of the connector. These protrusions function similarly to the full circular locking flange of FIG. 4. The axial distance 25 between the butt flange and the locking protrusions has a minimum value approximately equal to the wall thickness of the junction box. The maximum distance is not critical, but in practice, the distance preferably will range from about 1 to about 5 mm.

Figure 6:
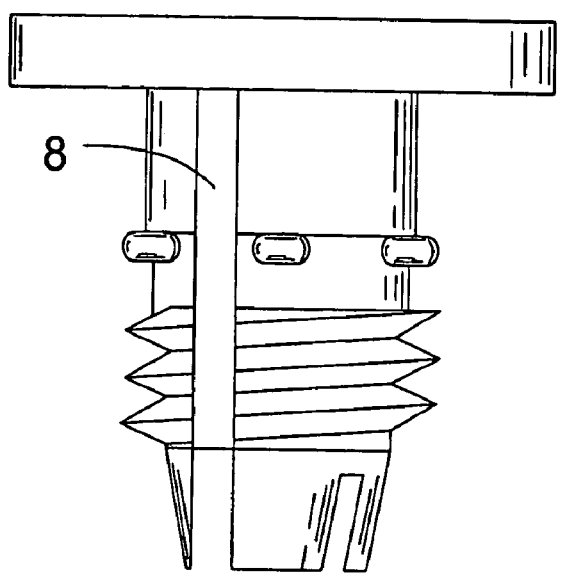
FIG. 6 is a side elevation view of another embodiment of the novel electrical connector.

In still another contemplated embodiment seen in FIG. 6, the connector has an axially aligned gap 8. This gap provides the connector with better ability to compress radially for easier insertion through the hole of a knock-out style connector receptacle. The connector can flex circumferentially to temporarily close the gap as it is inserted through the locking protrusions pass through the smaller diameter hole thus allowing the connector to be "snapped" into the hole more easily. FIG. 6 shows a single gap. A plurality of gaps can be used as well. When more than one gap is present, preferably the gaps are spaced equally around the circumference of the cylindrical body.

The axially aligned gap feature 8 optionally can be incorporated into the embodiment of FIGS. 1–4. In any of the connectors it is preferable that the gap 8 is contiguous with the space 17 (FIG. 4) between any two adjacent prongs.

The electrical connector of the invention preferably is nonmetallic to avoid the hazards of short circuiting in the unlikely event that the cable immobilizer contacts the conductors in the cable. Preferably the connector will be constructed of a substantially rigid, substantially non-conducting polymeric material. Non-exhaustive examples of such materials are polyethylene, polypropylene, polystyrene, polyvinylchloride, acrylonitrile-styrene-butadiene copolymer, polyamide and polytetrafluoroethylene.

Although specific forms of the invention have been selected in the preceding disclosure for illustration in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. An electrical connector for clamping a cable to an electrical junction box having female screw threads in an exterior wall of the box, said connector comprising (a) a hollow cylindrical body defining a tubular space configured to axially receive the cable, (b) a butt flange positioned at a first end of the body, (c) circumferentially disposed male screw threads on an exterior portion of the body, said threads being operative to mate with the female screw threads, (d) a self-actuating cable immobilizer integrally formed on the cylindrical body in the tubular space and configured to irreversibly accept the cable inserted axially into the first end, in which the butt flange has a radial dimension effective to stop the connector from screwing into the female screw threads in an axial direction beyond a position at which the butt flange contacts the exterior wall.

2. The electrical connector of claim 1 in which the cable immobilizer is positioned at a second end of the body opposite the first end.

3. The electrical connector of claim 1 in which the cable immobilizer is free of vise jaw clamping screws.

4. The electrical connector of claim 1 in which the body defines a central axis and the cable immobilizer comprises a pair of radially opposing prongs, each prong being affixed to the body and protruding into the tubular space in a direction away from the first end at an acute angle to the axis.

5. The electrical connector of claim 4 in which the cylindrical body defines an axially oriented gap in the butt flange and body of the connector aligned with a void defined between two circumferentially adjacent prongs.

6. The electrical connector of claim 1 which is suitable for clamping cable to a standard electrical junction box having a knock-out style connector receptacle defining a hole through the wall of the box having a uniform thickness, the hole having a radial dimension larger than the male screw threads and smaller than the radial dimension of the butt flange, which electrical connector further comprises a set of locking protrusions extending radially outward from the body at an axial distance from the butt flange slightly greater than the uniform thickness, the protrusions defining a circumscribing perimeter having a radial dimension greater than that of the hole, and in which the protrusions are operative to reversibly deflect radially inward when the connector is pushed axially into the knock-out style connector receptacle, thereby locking the butt flange and the locking protrusions on opposite sides of the wall.

7. The electrical connector of claim 6 in which the locking protrusions have a cross section profile defined by a leading edge at an acute angle to the axis and a trailing edge perpendicular to the axis.

8. The electrical connector of claim 6 in which the set of locking protrusions consists of a single circular locking protrusion extending substantially completely around the circumference of the body.

9. The electrical connector of claim 6 in which the cylindrical body defines an axially aligned gap in the butt flange, the set of locking protrusions and the body of the connector.

10. The electrical connector of claim 1 wherein the electrical connector is a non-metallic, non-conducting material.

11. An electrical connector comprising (i) a hollow cylindrical body having an front end and an back end, (ii) male screw threads defining an outer diameter of the body, (iii) a flange at the front end and extending radially outward from the body beyond the outer diameter of the screw threads, and (iv) a cable immobilizer, wherein the electrical connector is a single piece and each of the screw threads, flange and cable immobilizer are on the cylindrical body and inseparable therefrom, and wherein the cable immobilizer comprises a plurality of prongs each of which is attached by a first prong end to the periphery of the cylindrical body and extends toward a second prong end which is closer to the axis of the cylinder and more distant from the flange than the first prong end.

12. The electrical connector of claim 11 wherein the male screw threads are of a size suitable for mating with female screw threads of an electrical junction box.

13. The electrical connector of claim 12 which further comprises a locking protrusion on the cylindrical body and inseparable therefrom and being positioned at an axial distance away from the butt flange, the locking protrusion extending radially outward from the periphery of the cylindrical body to define a protrusion diameter, and in which the locking protrusion is operative to reversibly deflect radially inward such that inserting the connector axially through a hole defined by (i) a wall of uniform thickness at most as thick as the axial distance, and (ii) a hole diameter less than the protrusion diameter, causes the connector to lodge in the hole with the wall clamped between the butt flange and the locking protrusion.

14. The electrical connector of claim 13 wherein the protrusion diameter and axial distance are of such dimensions suitable for lodging the connector in the hole of a knock-out style electrical junction box.

* * * * *